(12) United States Patent
Murray et al.

(10) Patent No.: US 10,252,675 B2
(45) Date of Patent: *Apr. 9, 2019

(54) HEIGHT ADJUSTABLE LOAD COMPARTMENT FLOOR SYSTEM

(71) Applicant: Ford Global Technologies, LLC, Dearborn, MI (US)

(72) Inventors: Andy Murray, Colchester (GB); Daniel Berry, Hockley (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/789,313

(22) Filed: Oct. 20, 2017

(65) Prior Publication Data

US 2018/0037168 A1 Feb. 8, 2018

Related U.S. Application Data

(62) Division of application No. 15/338,516, filed on Oct. 31, 2016, now Pat. No. 9,827,914, which is a division
(Continued)

(30) Foreign Application Priority Data

Aug. 7, 2014 (GB) .................................. 1413988.5

(51) Int. Cl.
*B60R 5/04* (2006.01)
*B62D 25/20* (2006.01)
*B62D 33/04* (2006.01)

(52) U.S. Cl.
CPC ................ *B60R 5/045* (2013.01); *B60R 5/04* (2013.01); *B62D 25/20* (2013.01); *B62D 33/04* (2013.01)

(58) Field of Classification Search
CPC ........... B60R 5/04; B60R 5/044; B60R 5/045; B60R 5/048
See application file for complete search history.

(56) References Cited

U.S. PATENT DOCUMENTS 6,918,734 B2 7/2005 Nick et al.
7,401,716 B2 7/2008 Svenson et al.
(Continued)

FOREIGN PATENT DOCUMENTS

DE 102007042371 3/2009
DE 102009032892 1/2011
(Continued)

*Primary Examiner* — Hilary L Gutman
(74) *Attorney, Agent, or Firm* — Vichit Chea; Price Heneveld LLP

(57) ABSTRACT

A height adjustable floor system for a motor vehicle includes a load compartment floor having front and rear floor members that are pivotally connected together to permit relative rotation about a transverse axis. The load compartment cover can be positioned in upper and lower load carrying positions and be moved between these positions with the aid of a pair of first side supports each having a continuous groove defining a path to be followed by a pair of spaced apart guide members located on left and right sides of the front floor member near to a front end thereof. The rear floor member is used to facilitate the transitioning of the load compartment floor between the two load carrying positions and the first side supports are so configured that in the load carrying positions load is not transferred from the load compartment floor to the guide members.

20 Claims, 9 Drawing Sheets

Related U.S. Application Data of application No. 14/819,886, filed on Aug. 6, 2015, now Pat. No. 9,511,801.

(56) References Cited

U.S. PATENT DOCUMENTS

| | | |
|---|---|---|
| 9,090,210 B2 | 7/2015 | Demma |
| 2003/0015531 A1 | 1/2003 | Choi |
| 2015/0054299 A1 | 2/2015 | Yoshizawa et al. |
| 2016/0288720 A1 | 10/2016 | Huebner et al. |

FOREIGN PATENT DOCUMENTS

| | | |
|---|---|---|
| EP | 1728684 | 12/2006 |
| EP | 2048031 | 4/2009 |
| EP | 2181893 | 5/2010 |
| EP | 2399783 | 12/2011 |
| EP | 2899070 | 7/2015 |
| FR | 2885571 | 11/2006 |
| FR | 2891232 | 3/2007 |
| JP | 2007091105 | 4/2007 |
| JP | 2009241825 | 10/2009 |
| JP | 2010083311 | 4/2010 |

HEIGHT ADJUSTABLE LOAD COMPARTMENT FLOOR SYSTEM

CROSS-REFERENCE TO RELATED APPLICATIONS

The present application is a divisional of U.S. patent application Ser. No. 15/338,516 filed Oct. 31, 2016, entitled HEIGHT ADJUSTABLE LOAD COMPARTMENT FLOOR SYSTEM, which is a divisional of U.S. patent application Ser. No. 14/819,886 filed Aug. 6, 2015, entitled HEIGHT ADJUSTABLE LOAD COMPARTMENT FLOOR SYSTEM, now U.S. Pat. No. 9,511,801, which claims priority to United Kingdom Patent Application No. 1413988.5 filed on Aug. 7, 2014 entitled A HEIGHT ADJUSTABLE LOAD COMPARTMENT FLOOR SYSTEM, the entire disclosures of which are hereby incorporated herein by reference.

FIELD OF THE INVENTION

This invention relates to motor vehicles and in particular to a height adjustable load compartment floor system for a motor vehicle.

BACKGROUND OF THE INVENTION

Motor vehicles are increasingly required to provide more versatility and functionality. One area where improved versatility and functionality is required is in a load area or luggage compartment of a motor vehicle sometimes referred to as the 'trunk' or 'boot' of the motor vehicle.

It is known to provide a load compartment floor that covers the structural floor of the motor vehicle within the load compartment. It is further known to provide a means for lifting the load compartment floor so as to permit small objects such as for example a tool kit to be stored out of the way below the load compartment floor in a spare wheel well of the motor vehicle.

With such a motor vehicle, even if the full volume of the load compartment is not required for everyday use, it is always present because the volume and size of the load compartment is fixed.

The versatility of the load compartment could be improved if the load compartment floor were to be height adjustable. For example if the load compartment floor were to be mountable in upper and lower load carrying positions, then either two smaller volume load carrying compartments could be provided, one above and one below the load compartment floor or a single large volume load carrying compartment above the load compartment floor could be provided.

This would provide increased flexibility for a user of the motor vehicle and would also enable fragile articles such as, for example, electronic devices to be carried in a separate compartment from heavy or bulky items thereby reducing the risk of damage from occurring to the fragile articles. In addition, the storage compartment located below the load compartment floor would have the advantage that objects stored therein can be kept separate from those stored above the load compartment floor so that, for example, wet or dirty clothing could be stored separate from dry or clean articles.

It is also advantageous for any such height adjustable load compartment floor to be moveable between its two height positions in a simple and non-strenuous manner and preferably by a user using only one hand.

It is an object of the invention to provide a height adjustable load compartment floor of simple construction and operation able to be easily moved between at least two differing heights.

SUMMARY OF THE INVENTION

According to a first aspect of the invention, there is provided a height adjustable load compartment floor system for a load compartment of a motor vehicle comprising a load compartment floor supportable in at least upper and lower load carrying positions and having front and rear floor members pivotally connected together, a pair of first side supports attached to the motor vehicle for guiding a front end of the load compartment floor, a pair of second side supports attached to the motor vehicle for supporting the load compartment floor when it is in the upper load carrying position, at least one rear support attached to the motor vehicle for supporting a rear end of the load compartment floor when it is in the upper load carrying position wherein each of the first side supports defines a recumbent A-shaped substantially continuous groove, a pair of spaced apart guide members is located near a front end of the front floor member on each side of the front floor member for engagement with the respective A-shaped groove in the adjacent one of the pair of first side supports and the pair of first side supports and the two pairs of guide members are arranged to facilitate the re-positioning of the load compartment floor from one of the two load carrying positions to the other of the two load carrying positions by a combination of sliding and rotary motion of the front floor member.

When the load compartment floor is in the upper load carrying position, each of the second side supports may be arranged to support the load compartment floor in the region of the pivotal connection between the front and rear floor members.

When the load compartment floor is in the upper load carrying position, each of the second side supports may span the pivotal connection between the front and rear floor members.

The front floor member may have a recess on each longitudinal side to allow the front floor member to traverse the two second side supports when the load compartment floor is re-positioned from one of the two load carrying positions to the other of the two load carrying positions.

The front floor member may have a forward end a rear end and left and right sides extending between the front and rear ends, the rear floor member has a forward end, a rear end and left and right sides extending between the front and rear ends and the front end of the rear floor member is pivotally connected to the rear end of the front floor member so as to permit rotation of the rear floor member relative to the front floor member about a transverse axis of the load compartment floor.

The pair of first side supports in combination with the two pairs of guide members may facilitate the re-positioning of the load compartment floor from one of the two load carrying positions to the other load carrying position by guiding a sliding motion of the front floor member of the load compartment floor from the one load carrying position in a rearward direction supporting a rotation of the front floor member about a transverse pivot axis of the load compartment floor and guiding sliding motion of the front floor member of the load compartment floor in a forward direction into the other load carrying position.

Each of the A-shaped substantially continuous grooves may comprise an upper substantially horizontally disposed limb, a lower substantially horizontally disposed limb an inclined limb linking the upper and lower limbs and a transfer groove extending between the upper limb and the inclined limb at a position spaced away from the junction between the upper and inclined limbs so as to allow one of the pair of spaced apart guide members to transition between the upper and lower limbs during re-positioning of the load compartment floor.

Each upper limb may have a rear end defining a bearing surface for cooperation with a respective rear one of the two guide members on each side of the front floor member and the transverse pivot axis of the load compartment floor may be defined by the interaction of the second guide members and the bearing surfaces.

The pair of first side supports may be arranged such that in both of the load carrying positions load is not transferable from the load compartment floor to the pair of spaced apart guide members located on each side of the front floor member.

Each of the pair of first side supports may include an abutment member having an abutment surface and a well formed in a lower surface of the upper limb near a forward end thereof and, when the load compartment floor is in the upper load carrying position, a lower surface of the front floor member rests upon the abutment surface and each pair of spaced apart guide members is positioned adjacent to the well in the respective upper limb so as to prevent the transfer of load from the load compartment floor to the pair of spaced apart guide members located on each side of the front floor member.

Respective lower surfaces of the front and rear floor members may rest upon a floor of the load compartment when the load compartment floor is in the lower load carrying position so as to prevent the transfer of load from the load compartment floor to the pair of spaced apart guide members located on each side of the front floor member.

The rear floor member may be arranged for use in re-positioning the load compartment floor from one of the two load carrying positions to the other of the two load carrying positions.

When the load compartment floor is in the upper load carrying position, the rear floor member may be latchable in a substantially vertically upwardly extending position so as to provide a partition for the load compartment.

According to a second aspect of the invention, there is provided a motor vehicle having a body defining a load compartment wherein a height adjustable load compartment floor system constructed in accordance with said first aspect of the invention is fitted in the load compartment of the motor vehicle.

According to a third aspect of the invention, there is provided a method for re-positioning a height adjustable load compartment floor constructed in accordance with said first aspect of the invention between upper and lower load carrying positions, the method comprising using the rear floor member to slide the front floor member in a rearward direction from the current load carrying position until second guide members of the two pairs of guide members abut respective bearing surfaces located near a rear end of each of the first side supports, using the rear floor member to produce rotation of the first floor member about a transverse axis defined by the interaction of the second guide members and the bearing surfaces and using the rear floor member to slide the front floor member in a forward direction from the current position near the rear end of the first side supports until it reaches the other load carrying position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
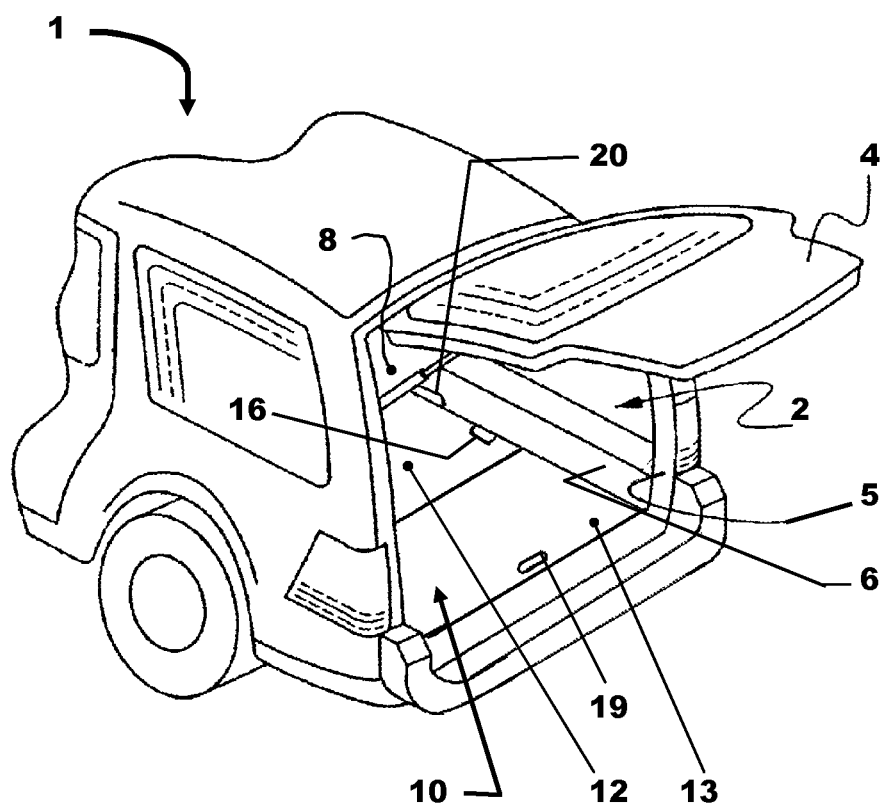
FIG. 1 is a pictorial view of a rear part of a five door motor vehicle showing a load compartment floor forming part of a height adjustable load floor system constructed in accordance with this invention in an upper position.

For purposes of description herein the terms "upper" "lower" "right" "left" "rear" "front" "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
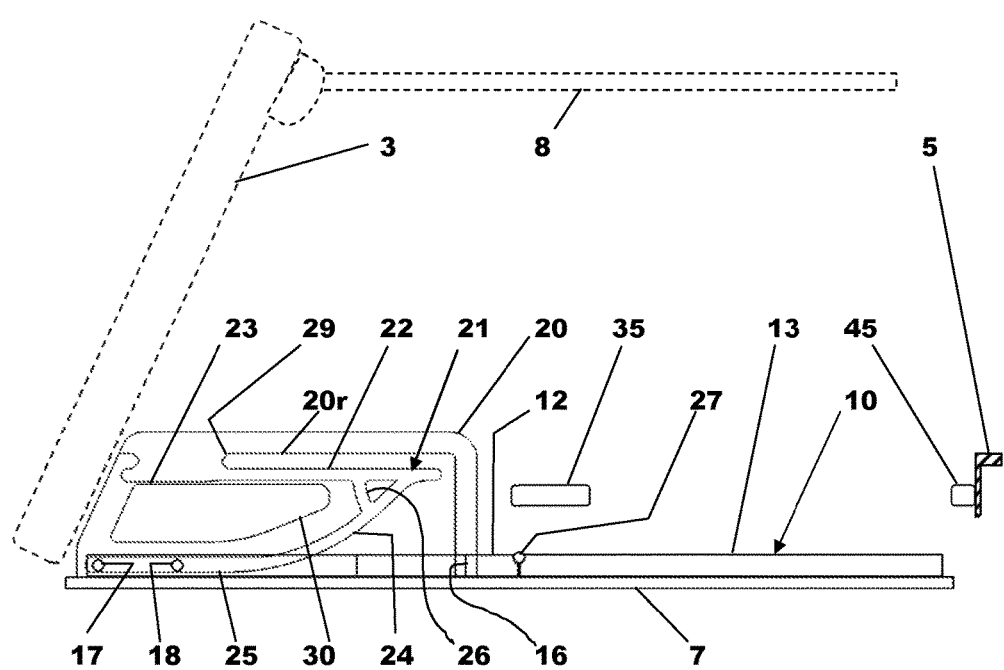
FIG. 2 is a cutaway side view of a load compartment of the motor vehicle showing the load compartment floor of the height adjustable load floor system in a lower load carrying position.
Figure 3:
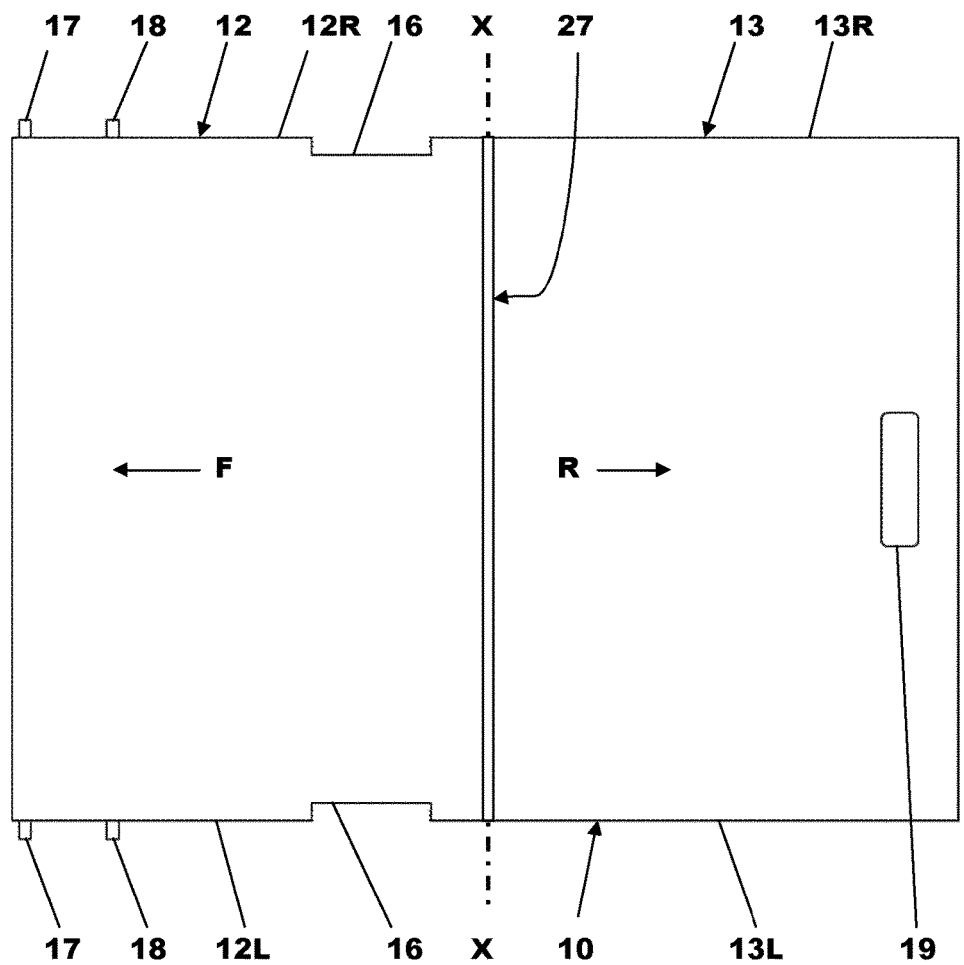
FIG. 3 is a plan view of the load compartment floor shown in FIGS. 1 and 2.

With particular reference to FIGS. 1 to 3 there is shown a rear part of a five door motor vehicle 1. The fifth or rear door 4 is shown open to reveal a load compartment 2 for transporting objects such as, for example, luggage. Access to the load compartment 2 is provided by a rear door aperture 5 formed as part of a body structure of the motor vehicle 1.

The rear door 4 when closed covers the rear door aperture 5 and forms a rear wall or boundary of the load compartment 2. A front wall or boundary of the load compartment 2 is normally formed by backrests 3 of a rear row of seats. The longitudinal sides of the load compartment 2 are formed by a pair of opposing side trim panels 6 of which only the right hand side trim panel 6 is visible in FIG. 1 and an upper boundary of the load compartment is formed in this case by a removable parcel shelf 8.

Figure 4:
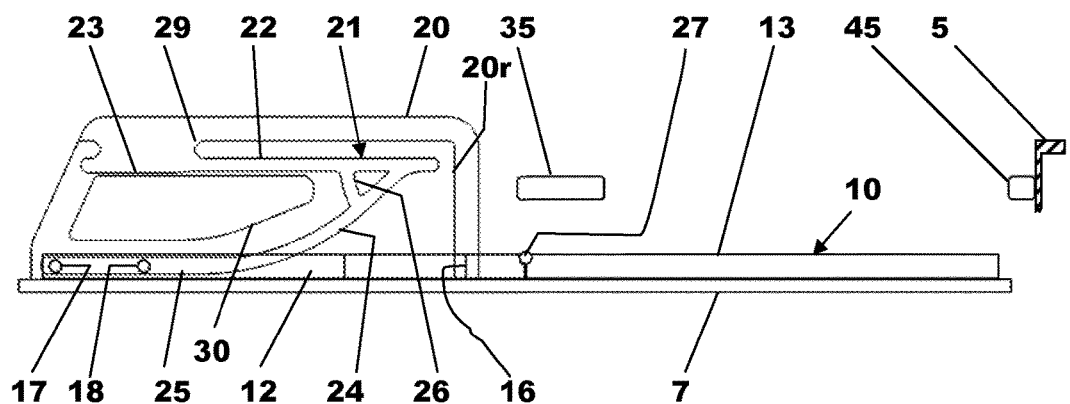
FIGS. 4 to 9 are views similar to FIG. 2 showing various stages during re-positioning of the load compartment floor from the lower load carrying position shown in FIG. 2 to the upper position shown in FIGS. 1 and 9.
Figure 9:
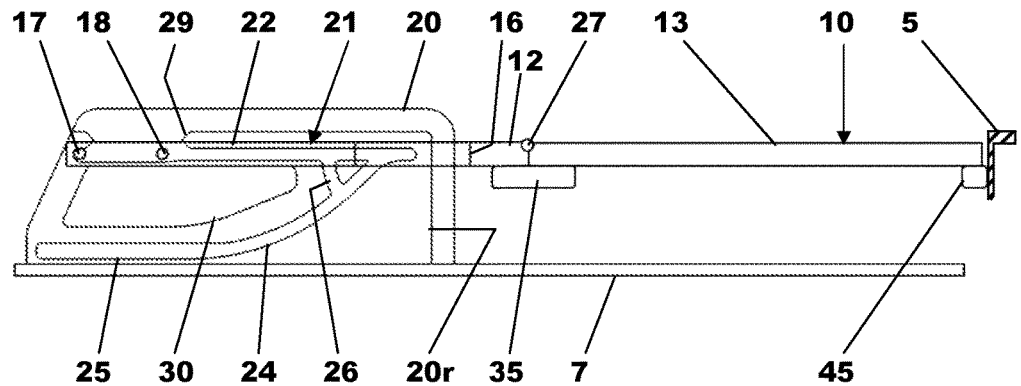

A height adjustable load compartment floor system is fitted in the load compartment 2. The height adjustable load compartment floor system includes a load compartment floor 10 comprised of front and rear floor members 12 and 13 that are pivotally connected together. The load compartment floor 10 can be positioned in an upper load carrying position as shown in FIGS. 1 and 9 or in a lower load carrying position as shown in FIGS. 2 and 4. When in the upper load carrying position, a secondary load carrying compartment is defined between the load compartment floor 10 and a floor 7 of the load compartment 2. The floor 7 of the load compartment 2 may be defined by part of the body structure of the motor vehicle 1 but is normally a trim panel or rigid carpet overlying the actual body structure of the motor vehicle 1.

The front floor member 12 has a recess 16 on each longitudinal side edge 12L, 12R and the rear floor member 13 has longitudinal side edges 13L, 13R and an aperture 19 near to a rear end forming a handle for use in assisting with the transitioning or re-positioning of the load compartment floor 10 between its upper and lower load carrying positions. It will be appreciated that other types of handle could be used.

The arrows "F" and "R" on FIG. 3 indicate the direction of the front and rear ends of the motor vehicle 1 and the location terms applied to the height adjustable load compartment floor system use the same reference system as would be applied to the motor vehicle 1. For example 'front' means toward the front of the motor vehicle 1 'rear' means towards the rear of the motor vehicle 1 'transverse axis' means an axis aligned with a transverse axis of the motor vehicle 1.

The front floor member 12 has a forward end, a rear end and left and right sides 12L and 12R extending between the front and rear ends.

The rear floor member 13 has a forward end, a rear end and left and right sides 13L and 13R extending between the front and rear ends.

The front end of the rear floor member 13 is pivotally connected to the rear end of the front floor member 12 to permit rotation of the rear floor member 13 relative to the front floor member 12 about a transverse axis X-X of the load compartment floor 10. Such rotation is required during re-positioning of the load compartment floor 10 between its upper and lower load carrying positions and for gaining access to a lower load compartment when the load compartment floor 10 is in the upper load carrying position.

The reference numeral 27 is used to indicate the position of the pivotal connection between the front and rear floor members 12 and 13 that defines a transverse axis X-X. In practice, a hinged connection is provided between the front and rear floor members 12 and 13 to permit relative rotation about the transverse axis X-X. The hinged connection may be of any suitable form such as, for example and without limitation, a live hinge. Such a live hinge may be formed by trim material such as carpet used to cover the front and rear floor members 12 and 13.

The construction and positioning of the hinged connection at or near an upper surface of the load compartment floor 10 permits the rear floor member 13 to be freely folded upwardly but restricts downward folding of the rear floor member 13.

For example and without limitation, an included angle between upper surfaces of the front and rear floor members 12 and 13 may be increased in a first direction of rotation from a normal, in use, angle of substantially 180 degrees by only a few degrees due to the restricting effect of the hinged connection. That is to say pivoting between the two floor members 12 and 13 in said first direction may be restricted to movement from said substantially 180 degrees to, for example, 190 degrees.

However, pivoting between the two floor member 12 and 13 in a second, opposite, direction of rotation is less restricted. For example and without limitation, the rear floor member 13 may be pivoted relative to the front floor member 12 such that the included angle defined between the upper surfaces of the front and rear floor members 12 and 13 can be reduced from said substantially 180 degrees to substantially 90 degrees or less.

This limited pivotal movement in the first direction of rotation enables the rear floor member 13 to more easily be used to control the re-positioning of the front floor member 12.

The relatively unrestricted pivotal movement between the front and rear floor members 12 and 13 in the second direction of rotation facilitates the provision of an additional feature of the load compartment floor 10, namely improved load compartment organization. Due to the relatively unrestricted movement provided by the hinged connection pivotal connection 27, the rear floor member 13 can be rotated and latched in a substantially vertical orientation in order to act as a 'partition' for the load compartment. Such a partition permits the load compartment space to be better organized by separating different types or sizes of article from one another.

The height adjustable load compartment floor system includes a pair of first side supports 20, each defining a recumbent A-shaped substantially continuous recess or groove 21 for supporting the left and right sides 12L and 12R respectively of the front floor member 12 at the front end of the front floor member 12 and for guiding the front floor member 12 between the upper and lower load carrying positions of the load compartment floor 10.

Figure 12:
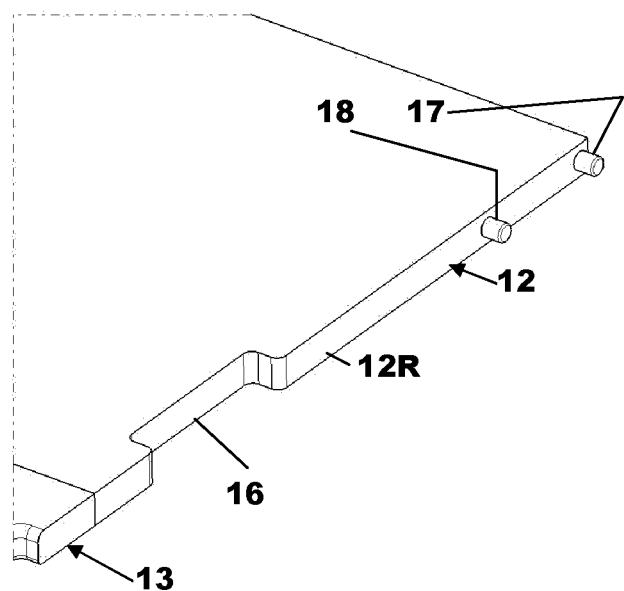
FIG. 12 is a partial pictorial view of part of a load compartment floor showing a first guide arrangement used in the height adjustable load floor system shown in FIGS. 1 to 11.

A first guide arrangement comprises first and second spaced apart guide members 17, 18 and is located near the front end of the front floor member 12 on the left side 12L of the front floor member 12 for engagement with the groove 21 in a left hand side one of the pair of first side supports 20 and a second guide arrangement shown on an enlarged scale in FIG. 12, comprises first and second spaced apart guide members 17, 18 and is located near a front end of the front floor member 12 on the right side 12R of the front floor member 12 for engagement with the continuous guide groove 21 in a right hand one of the pair of first side supports 20. In all cases, the first guide member 17 is located closer to a front end of the front floor member 12 than the second guide member 18.

Each of the guide members 17, 18 comprises in this case, of a cylindrical pin projecting out from the respective side 12L, 12R of the front floor member 12. It will however be appreciated that the guide members 17, 18 could be of a different shape provided they are able to slidingly guide and rotatably support the front floor member 12 during re-positioning.

The height adjustable load compartment floor system further includes a pair of second or intermediate side supports 35 attached to the motor vehicle 1 via, in this case, the side trim panels 6 for supporting in the region of the pivotal connection 27 between the front and rear floor members 12 and 13 of the load compartment floor 10 when it is in the upper load carrying position. Each of the second side supports 35 projects inwardly from a respective side trim member 6 such that the distance between the inner ends of the two second side supports 35 is considerably less than the width of the front floor member 12 between its respective left and right hand sides 12L and 12R. This enables the second side supports 35 to support the load compartment floor 10 when it is positioned in the upper position in the region of the pivotal connection 27. In the embodiment shown, each of the second side supports spans the pivotal connection 27 so that it provides support for the rear end of the front floor member 12 and for the front end of the rear floor member 13.

The height adjustable load compartment floor system further includes at least one rear support 45 for supporting the rear end of the rear floor member 13 when the load compartment floor is in the raised position. In the embodiment shown there are two spaced apart rear supports 45 located to support the rear end of the rear floor member 13. Each of the rear supports 45 is fastened to part of the structure of the motor vehicle 1 and, in this case, is attached to a structural member defining part of the rear door aperture 5, alternatively the rear supports 45 could be molded into a back-panel interior trim part.

Figure 14:
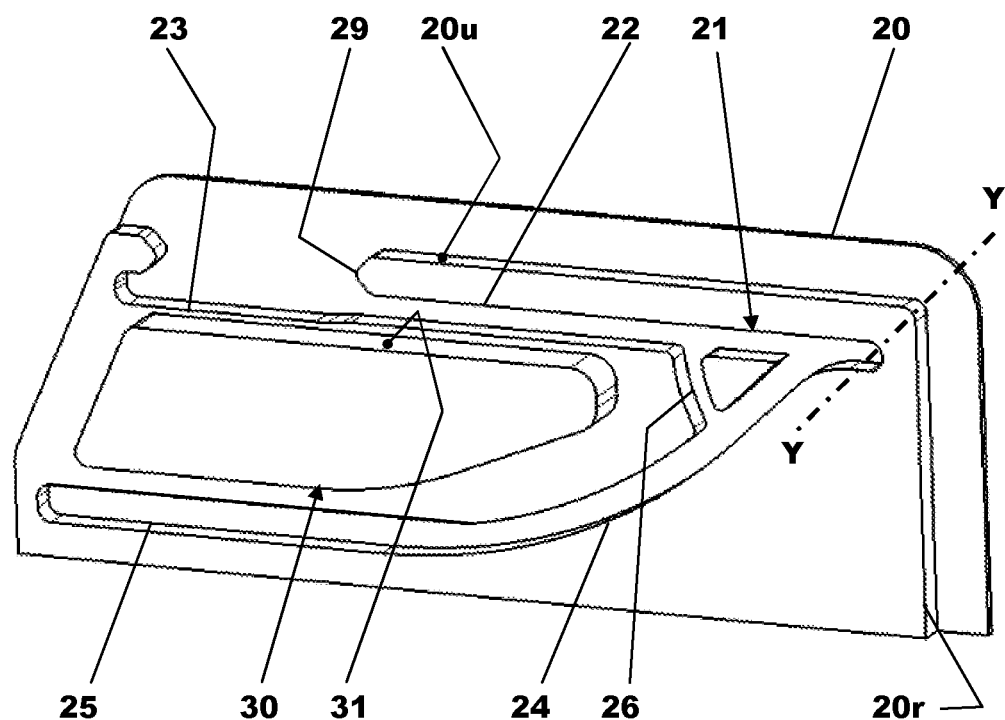
FIG. 14 is a pictorial view on a larger scale of a first side support used in the height adjustable load floor system shown in FIGS. 1 to 11.

With particular reference to FIG. 14, a right hand one of the pair of first side support 20 is shown on an enlarged scale from which it can be better seen that the recumbent A-shaped substantially continuous groove 21 comprises an upper substantially horizontal limb 22, a lower substantially horizontal limb 25, an inclined limb 24 linking the upper and lower limbs 22 and 25 and a transfer groove 26 extending between the upper limb 22 and the inclined limb 24 at a position spaced away from the junction between the upper and inclined limbs 22 and 24. The term 'recumbent A-shaped groove' means a groove that is substantially A-shaped and has been rotated from its normal upright position to a laid over position in which one of the limbs that normally extends in a substantially vertical direction is positioned substantially horizontally.

The inclined limb 24 of each first side support 20 is a curvilinear shaped limb and joins the upper limb 22 at a position spaced apart from a rear end of the upper limb 22 by a small amount. The rear end of the upper limb 22 of each first side support 20 forms a bearing surface for the second guide member 18 of each guide arrangement. The bearing surface is used to facilitate rotation of the front floor member 12 during transition between its upper and lower load carrying positions about a transverse axis Y-Y defined by the interaction of the two second guide members 18 with the bearing surfaces at the rear ends of the upper limbs 22.

The transfer groove 26 extends between the upper limb 22 and the inclined limb 24 and is positioned a radial distance from the transverse axis Y-Y corresponding to the distance between the two guide members 17, 18. That is to say, when the two second guide members 18 are positioned against the respective bearing surfaces in the upper limbs 22 of the two first side supports 20 and the front floor member 12 is rotated, the first guide members 17 each scribe an arc defining substantially the position and shape of the respective transfer groove 26. It will however be appreciated that the width of each of the transfer grooves 26 is slightly greater than the diameter of the respective first guide member 17 that must transition therethrough.

The transfer grooves 26 allow the first guide members 17 to transition between the upper limb 22 and the inclined limb 24 or vice-versa during rotational movement of the front floor member 12 about the transverse axis Y-Y.

The width of the lower limb 25 is greater than the diameter of the first and second guide members 17 and 18 by an amount that is greater than the clearance between the first and second guide pins 17 and 18 and the upper and inclined limbs 22 and 24. This additional clearance allows the front floor member 12 to rotate about the first guide members 17 by a small amount as the second guide members 18 engage or disengage with the respective inclined limbs 24 thereby easing the transition of the guide members 17, 18 between the lower and inclined limbs 25 and 24.

The lower limb 25 is positioned such that it allows a lower surface of the front floor panel 12 to rest upon the floor 7 of the load compartment 2 when the front floor member 12 is in the lower load carrying position. Therefore, any loads applied to the load compartment floor 10 when in the lower load carrying position due to the carriage of articles are transferred directly into the floor 7 and do not have to be resisted by the guide members 17, 18. The guide members 17, 18 therefore only have to resist the forces applied to them from the front floor member 12 during transition of the load compartment floor 10 between its upper and lower load carrying positions.

Each continuous groove 21 is formed in or defined by a thickened or raised portion 20r of the respective first side support 20. A gap 29 is provided in an upper face of each upper limb 22 near to a front end of the respective upper limb 22. The gap 29 is provided so that the front floor member 12 can be disengaged from the two first side supports 20 allowing the load compartment floor 10 to be removed from the motor vehicle 1. If it were not for the presence of the gap 29, each of the grooves 21 would be a 'continuous groove', the term 'substantially continuous groove' being used to indicate the presence of the gap 29.

Each of the first side supports 20 further includes an abutment member 30 for supporting the front end of the front floor member 12 when the load compartment floor 10 is in its upper position. The abutment member 30 includes an upper abutment surface 31 upon which the lower surface of the front floor member 12 rests when the load compartment floor 10 is in the upper load carrying position.

A load transfer arrangement in the form of an abutment member 30 having an abutment surface 31 and a well 23 in the upper limb 22 is provided in each of the first side supports 20 to ensure that any loads applied to the load compartment floor 10 when in use in the upper load carrying position due to the carriage of articles are transferred to the abutment member 30 and do not have to be resisted by the guide members 17, 18. The guide members 17, 18 therefore only have to resist the forces applied to them from the front floor member 12 during transition of the load compartment floor 10 between its upper and lower load carrying positions.

The well or recess 23 is located in a lower surface of the upper limb 22 of each first side support 20 near to a front end of the upper limb 22. The depth of the well 23 is such that the two guide members 17, 18 are spaced away from the lower surface of the upper limb 22 when located in the well 23 due to the lower surface of the front floor member 12 coming into contact with the abutment member 30.

Figure 15:
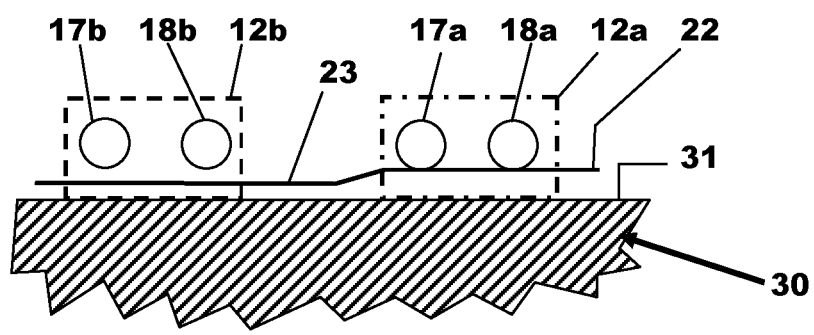
FIG. 15 is a schematic diagram showing a load transfer aspect of the first side support.

FIG. 15 shows this load transfer arrangement schematically, the reference numerals 12a, 17a and 18a representing the position of the front floor member, first guide member and second guide member respectively during a guiding phase of operation and the reference numerals 12b, 17b and 18b representing the position of the front floor member, first guide member and second guide member respectively when the load compartment floor is in its upper position.

When in a guiding phase of operation, the two guide members 17a, 18a are in contact with the lower surface of the upper limb 22. As the lower surface of the front floor member 12a slides forward, it comes into contact with the rear section of abutment surface 31 on the abutment member 30 but the two guide members 17a, 18a remain in contact with the lower surface of the upper limb 22. However, when the load compartment floor 10 is positioned fully forward in its upper load carrying position, the two guide members 17b, 18b are spaced away from the lower surface of the upper limb 22 due to the presence of the well 23 and the fact that the lower surface of the front floor member 12b is in full contact with the abutment surface 31 on the abutment member 30.

It will be appreciated that each of the first side supports 20 could be separate component fastened or attached to the respective side wall 6 of the load compartment 2 or could be formed as an integral part of a trim panel used to form the respective side wall 6 of the load compartment 2.

Figure 13:
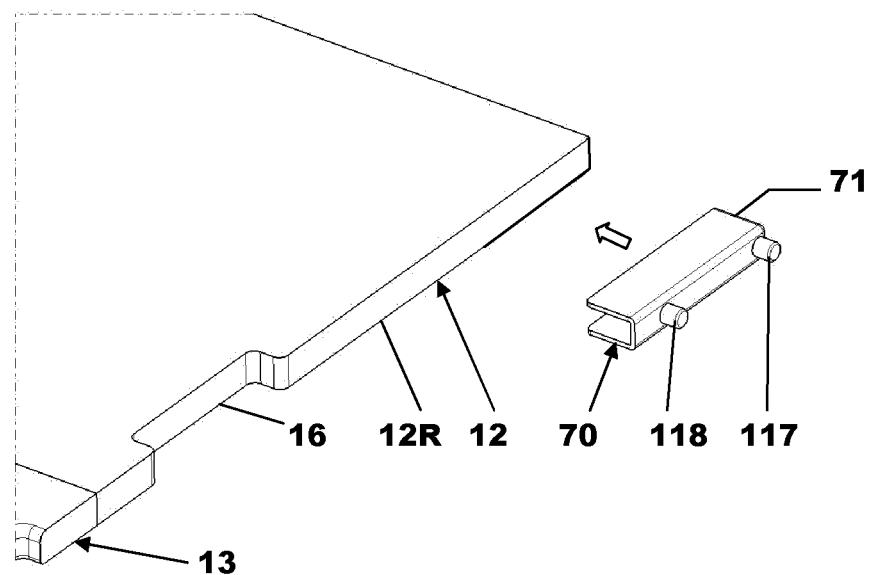
FIG. 13 is a partial pictorial view of part of a load compartment floor showing an alternative guide arrangement for use in the height adjustable load floor system shown in FIGS. 1 to 11.

FIG. 13 shows an alternative guide arrangement 70 that is intended to be a direct replacement for that shown in FIGS. 2 to 12 and comprises first and second spaced apart guide members 117, 118 that are fastened to a carrier 71 that is attached near to the front end of the front floor member 12 on, in this case, the right side 12R of the front floor member 12. The spacing and size of guide members 117, 118 is the same as that previously described and the only significant difference between the two embodiments is that, in the case of the first embodiment, the guide members 17, 18 are directly fastened to or integrated as part of the front floor member 12 whereas in this second embodiment the guide members 117, 118 are attached to the front floor member 12 by means of the carrier 71.

The load compartment floor 10 is moveable between its upper and lower load carrying positions in a simple manner using the rear floor member 13 and in particular the handle 19 in the rear floor member 13 and re-positioning or transitioning of the load compartment floor 10 can normally be achieved using only one hand due to the guiding properties of the first side supports 20.

To transition the load compartment floor 10 in either direction requires the following basic steps:

use of the rear floor member 13 to slide the front floor member 12 in a rearward direction from the current load carrying position near the front end of the first side supports until both of the second guide members 18 engage with the respective bearing surface at the rear end of the upper limb 22 with which they are engaged;

use of the rear floor member 13 to produce rotation of the first floor member 12 about the transverse axis Y-Y so as to cause the first guide members 17 to travel through the transfer grooves 26 into a different limb 24 or 22; and use of the rear floor member 13 to slide the front floor member 12 in a forward direction from the current position near the rear end of the first side supports 20 until it reaches the opposite load carrying position from where it started.

FIGS. 4 to 9 show various steps in a method required to re-position or transition the load compartment floor 10 from its lower load carrying position to its upper load carrying position. It will be appreciated that by reversing these steps the load compartment floor 10 can be transitioned from the upper load carrying position to the lower load carrying position.

In FIG. 4, the load compartment cover 10 is located in the lower load carrying position and rests upon the load compartment floor 7. As previously discussed, in this position no load is transferable to the first and second guide arrangements because the respective guide members 17, 18 are not in contact with the lower surface of the lower limb 25.

Figure 5:
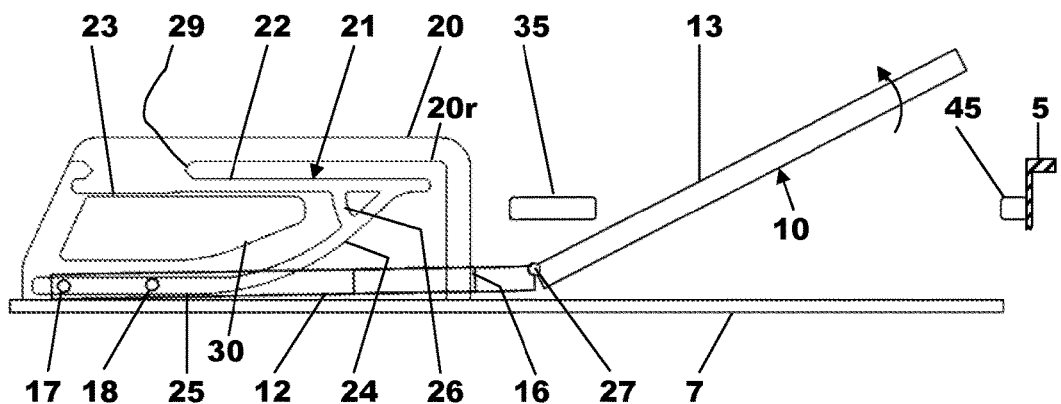

From the lower load carrying position, the first step is for a user to take hold of the rear floor member 13 using the handle 19 and to lift it upwardly causing the rear floor member 13 to rotate about the pivotal connection 27 defining the transverse pivot axis X-X shown in FIG. 3. The user then simultaneously pulls on the rear floor member 13 causing it and the front floor member 12 to be moved in a rearward direction. In FIG. 5 the front floor member 12 has started to move in a rearward direction away from the lower load carrying position and has rotated slightly.

Figure 6:
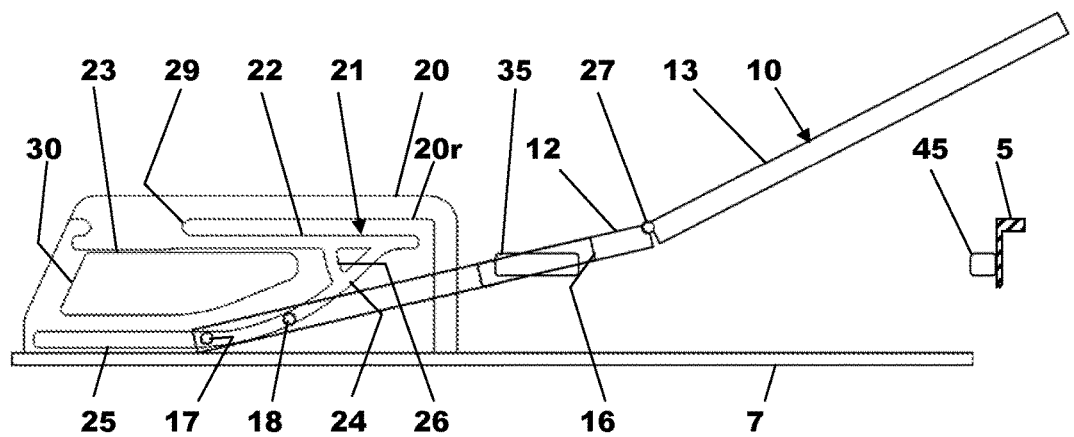

Continuing to pull the rear floor member 13 in a rearward direction causes the two guide members 17, 18 on each side of the front floor member 12 to engage with the inclined limb 24 in the respective first side support 20. This action causes the guide members 17, 18 of the first and second guide arrangements at the front end of the front floor member 12 to slide along the lower limbs 25 into the inclined limbs 24 thereby moving the front floor member 12 into a slightly inclined position. Due to the shape and inclination of the inclined limbs 24 and the positioning of the recesses 16 in the sides 12L, 12R of the front floor member 12, the front floor member 12 is able to traverse upwardly past the second side supports 35. In FIG. 6, the front floor 12 is shown in the position where it is traversing the second side supports 35. This part of the process is important because the front floor member 12 must be able to traverse the second side supports 35 because in the upper load carrying position the load compartment floor 10 rests upon the second side supports 35 and in the lower load carrying position it rests below the second side supports 35 and the second side supports 35 are in this case fixed to the motor vehicle 1. It would be possible to use removable second side supports but this would complicate the re-positioning of the load compartment floor as the second side supports would need to be removed and then replaced every time the load compartment floor is re-positioned. There is also the risk of one of the second side supports being lost and each of the second side supports would be more expensive to manufacture.

Figure 7:
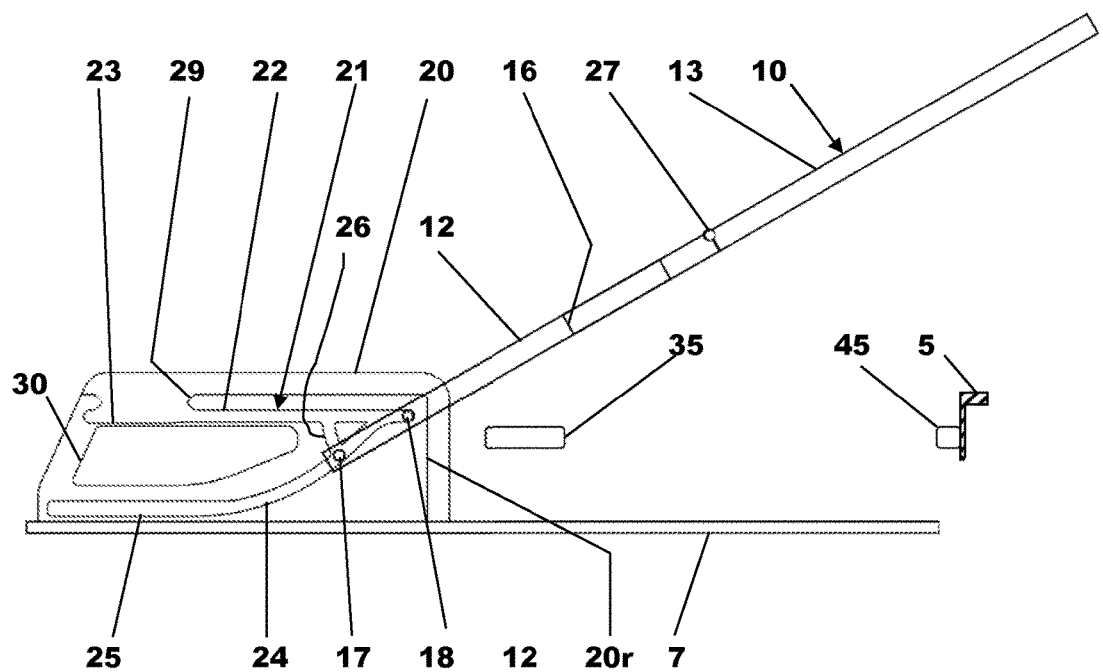

From the position shown in FIG. 6, the user continues to pull on the rear floor member 13 and the front floor member 12 continues to follow a path defined by the inclined limbs 24 and the two guide members 17, 18. Eventually as shown in FIG. 7, the second guide members 18 come into contact with the bearing surfaces formed by the rear ends of the upper limbs 22 and the first guide members 17 are aligned with the transfer grooves 26.

By the application of a force in a primarily downward direction, the user is now able to cause the front floor member 12 to be rotated about the transverse axis Y-Y defined by the interaction of the guide members 18 with the bearing surfaces formed by the rear ends of the upper limbs 22. This action will cause the front floor member 12 to be rotated in a clockwise direction from the position shown in FIG. 7 to the position shown in FIG. 8 in this case. The first guide members 17 will, due to this rotation, travel along the transfer grooves 26 from the inclined limbs 24 into the upper limbs 22. Note that because the front floor member 12 is pivotally supported at this time by the interaction of the guide members 18 with the bearing surfaces formed by the rear ends of the upper limbs 22, the mass of the front and rear floor members 12 and 13 to the rear of the guide members 18 assists with the rotation of the front floor member 12. One of the advantages of the invention is that there is no need to physically lift the load compartment floor 10 at any stage in the re-positioning process. This is important because, particularly for users with back problems or who have limited strength, lifting the load compartment floor could be problematic.

Figure 8:
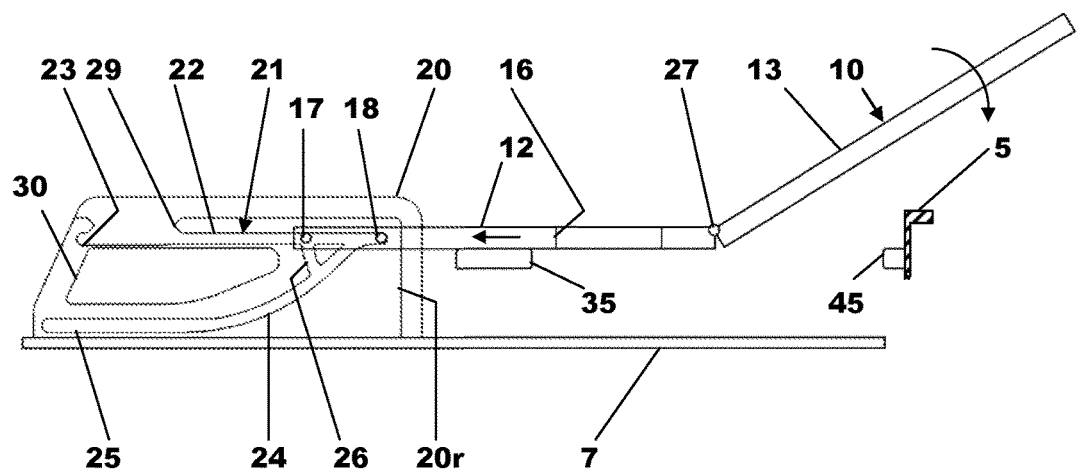

In FIG. 8, the guide members 17, 18 on both sides 12L, 12R of the front floor member 12 are engaged with the respective upper limbs 22 and the front floor member 12 is resting upon the second side supports 35. To move the load compartment floor 10 from this position to the upper load carrying position merely requires the front floor member 12 to be moved forwardly causing the guide members 17, 18 to slide along the upper limbs 22 until they reach the well 23 in the upper limbs 22. At this point the floor is fully supported by the lower face of the front floor 12 acting on the abutment surface 31 of the abutment member 30. At the same time as the load compartment floor 10 is being moved forwardly, the rear floor member 13 is gradually lowered until a lower surface of the rear floor member 13 finally rests upon the third or rear support 45. Furthermore, during the point at which the recesses 16 pass over the second side supports 35, the guide members 17, 18 are fully engaged in the respective upper limbs 22 and therefore prevent the floor assembly dropping or otherwise catching on the second side supports 35 until such time that the rear edge of the recesses 16 pass over the second side supports 35.

FIG. 9 shows the load compartment floor 10 in the upper load carrying position. In this position, the front of the front floor member 12 rests upon the abutment members 30, the pivotal connection between the front and rear floor members 12 and 13 is supported by the second side support members 35 which are arranged to span the pivotal connection 27 so as to form a support for the rear end of the front floor member and a front end of the rear floor member 13 and the rear end of the rear floor member 13 is supported upon the rear supports 45. The load compartment floor 10 is therefore well supported and the four guide members 17, 18 arranged in two pairs for guiding the load compartment floor 10 between its upper and lower load carrying positions are isolated from any loads applied to the load compartment floor 10 due to the carriage of heavy objects thereby preventing damage occurring to the guiding apparatus.

Figure 10:
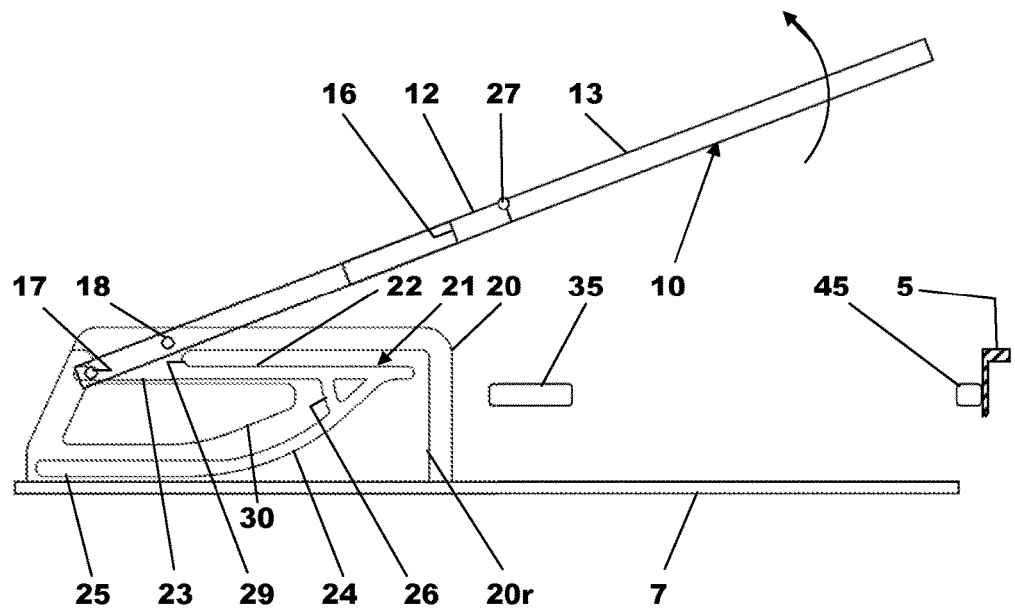
FIGS. 10 and 11 show two steps forming part of a process for removing the load compartment floor from the motor vehicle.
Figure 11:
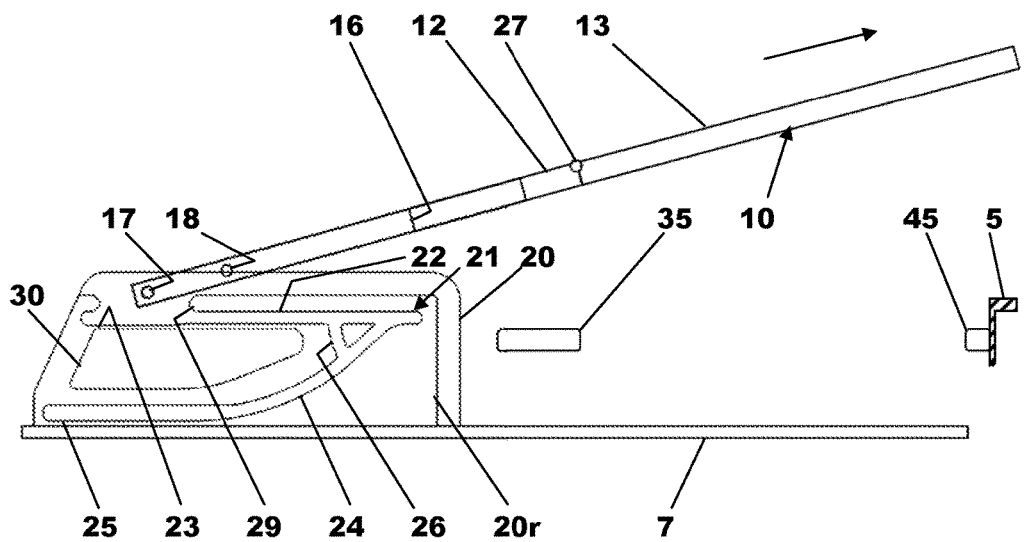

FIGS. 10 and 11 show how the load compartment floor 10 can be removed from the load compartment 2 of the motor vehicle 1.

From the upper load carrying position shown in FIG. 9, the entire load compartment cover is rotated about the first guide members 17 by a user lifting the load compartment cover 10 at a rear end using the handle 19 in the rear floor member 13. The abutment member 30 and the front floor member 12 are shaped and positioned so as to permit the load compartment floor 10 to be rotated sufficiently to allow the second guide member 18 to pass through the gap 29 in the upper limbs 22 without the movement of the front end of the front floor member 12 being obstructed by the abutment member 30. In FIG. 10, the position of the load compartment cover 10 is shown at a position where each of the second guide members 18 has just traversed through the respective gap 29 in the upper limb 22. Note that the lower surface of the front floor member 12 is resting upon the raised portion 20r of the first side support 20 so as to assist with the removal of the load compartment floor 10. From this position the load compartment floor 10 is pulled by the user in a rearward and upward direction causing the lower surface of the front floor member 12 to slide over the adjacent raised portion 20r of the first side support 20. FIG. 11 shows the position where sliding of the load compartment floor 10 has moved the load compartment cover 10 from the upper load carrying position and the front floor member 12 is being slidingly supported by the respective raised portions 20r of the two first side supports 20. From this position the load compartment floor 10 can be lifted out or preferably is slid in a rearward direction along an upper face (indicated as 20u on FIG. 14 only) of the raised portions 20r thereby reducing the effort eventually required to lift the load compartment floor 10 from the load compartment 2.

To replace the load compartment floor 10, it is first lifted into the load compartment 2 of the motor vehicle 1 and maneuvered forwardly until the front end of the front floor member 12 can be rested upon the upper surfaces 20u of the two first side supports 20.

The load compartment floor 10 is then pushed forwardly using the rear floor member 13 causing the front floor member 12 to slide along the upper surfaces 20u of the two side supports 20. When the first guide members 17 have passed by a rear edge of the respective gaps 29 in the upper limbs 22, the load compartment cover 10 is rotated by lifting the rear floor member 13 higher causing the first guide members 17 to enter the upper limbs 22 of the two first side supports 20.

When the two first guide members 17 contact the front end of the upper limbs 22, the load compartment floor 10 can be rotated about the first guide members 17 causing the second guide members 18 to pass through the gaps 29 and eventually re-positioning the load compartment floor 10 in its upper load carrying position.

Although the invention has been described with reference to a five door motor vehicle, it will be appreciated that it could be used with similar beneficial effect in other motor vehicles such as, for example, a four door vehicle having a separate load carrying compartment (trunk or boot) for the carriage of objects or luggage.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A height-adjustable floor for a load compartment of a motor vehicle comprising:
  a load compartment floor operable between upper and lower load carrying positions and having pivotable front and rear floor members pivotally connected together, the front floor member defining a recess within each longitudinal side thereof;
  a pair of recumbent A-shaped grooves of the load compartment;
  a pair of side supports of the load compartment, each side support of the pair of side supports disposed adjacent to a corresponding A-shaped groove of the pair of recumbent A-shaped grooves, the pair of side supports selectively supporting the load compartment floor in the upper load carrying position; and
  two pairs of first and second guide members located near a front end of the front floor member for engagement with the pair of recumbent A-shaped grooves, respectively, and slidably operable therein to position the load compartment floor between the upper or lower load carrying positions, and wherein the recesses of the front floor member traverse the pair of side supports to further position the load compartment floor between the upper and lower load carrying positions, wherein the upper and lower load carrying positions are defined by parallel horizontal limbs of the recumbent A-shaped grooves.

2. The height-adjustable floor of claim 1, wherein the front floor member rests upon the pair of side supports in the upper load carrying position.

3. The height-adjustable floor of claim 1, further comprising:
at least one rear support attached to the motor vehicle for supporting a rear end of the load compartment floor when it is in the upper load carrying position.

4. The height-adjustable floor of claim 1, wherein each A-shaped groove of the pair of recumbent A-shaped grooves is a channel defined within a panel member that is attached to a side wall of the load compartment.

5. The height-adjustable floor of claim 1, wherein the pair of side supports are positioned rearward of the pair of recumbent A-shaped grooves within the load compartment.

6. The height-adjustable floor of claim 3, wherein the at least one rear support is disposed proximate a rear wall of the load compartment proximate a door aperture.

7. The height-adjustable floor of claim 1, wherein when the load compartment floor is in the upper load carrying position, each of the side supports is arranged to support the load compartment floor proximate a hinge defining the pivotal connection between the front and rear floor members.

8. The height-adjustable floor of claim 1, wherein respective lower surfaces of the front and rear floor members rest upon a floor of the load compartment when the load compartment floor is in the lower load carrying position, and wherein the two pairs of first and second guide members located on each side of the front floor member, respectively, are free of supporting the load compartment floor in the lower load carrying position.

9. The height-adjustable floor of claim 1, wherein the pair of recumbent A-shaped grooves in combination with the two pairs of first and second guide members facilitate re-positioning of the load compartment floor from one of the upper and lower load carrying positions to the other of the upper and lower load carrying positions by guiding a sliding motion of the front floor member of the load compartment floor from one of the upper and lower load carrying positions in a rearward direction, supporting a rotation of the front floor member about a transverse pivot axis of the load compartment floor and guiding the sliding motion of the front floor member of the load compartment floor in a forward direction into the other of the upper and lower load carrying positions.

10. A height-adjustable floor for a load compartment of a motor vehicle comprising:
front and rear floor members pivotally connected together;
a pair of recumbent A-shaped grooves and a pair of side supports of the load compartment; and
two pairs of guide members located on the front floor member and slidably operable within horizontal limbs of the pair of recumbent A-shaped grooves, respectively, to position the front and rear floor members between upper and lower positions.

11. The height-adjustable floor of claim 10, wherein recesses of the front floor member traverse the pair of side supports to further position the front and rear floor members between the upper and lower positions.

12. The height-adjustable floor of claim 10, wherein the front floor member in the upper position rests upon the pair of side supports.

13. The height-adjustable floor of claim 10, further comprising:
at least one rear support attached to the motor vehicle for supporting a rear end of the rear floor member when in the upper position.

14. The height-adjustable floor of claim 10, wherein the pair of recumbent A-shaped grooves are channels defined within opposing panel members that are attached to opposing sidewalls of the load compartment.

15. The height-adjustable floor of claim 10, wherein the pair of side supports are positioned rearward of the pair of recumbent A-shaped grooves within the load compartment.

16. The height-adjustable floor of claim 10, wherein when the front and rear floor members are in the upper position, each of the side supports is arranged to support the front and rear floor members proximate a hinge defining the pivotal connection between the front and rear floor members.

17. The height-adjustable floor of claim 10, wherein respective lower surfaces of the front and rear floor members rest upon a floor of the load compartment when in the lower position, and wherein the two pairs of guide members located on each side of the front floor member, respectively, are free of supporting the front floor member in the lower position.

18. A height-adjustable floor for a load compartment of a motor vehicle comprising:
pivotally engaged front and rear members;
side supports and recumbent grooves each disposed on opposing load-compartment sides; and
guide members and a recess on each side of the front member wherein the guide members slidably operate within upper and lower horizontal limbs of the recumbent grooves, respectively, and each recess traverses the side supports, respectively, to define upper and lower positions of the front and rear members.

19. The height-adjustable floor of claim 18, wherein the recumbent grooves are recumbent A-shaped grooves having the horizontal limbs.

20. The height-adjustable floor of claim 18, wherein each side of the front member includes a pair of the guide members that slidably operate within the recumbent grooves, respectively.

* * * * *